(No Model.)

J. H. STARIN.
APPARATUS FOR STEAMING CLAMS, OYSTERS, &c.

No. 475,353. Patented May 24, 1892.

Witnesses:
Raphaël Netter
Charles M. Hooker

John H. Starin, Inventor
by
Kerr & Curtis, Attorneys.

UNITED STATES PATENT OFFICE.

JOHN H. STARIN, OF FULTONVILLE, NEW YORK.

APPARATUS FOR STEAMING CLAMS, OYSTERS, &c.

SPECIFICATION forming part of Letters Patent No. 475,353, dated May 24, 1892.

Application filed December 10, 1891. Serial No. 414,556. (No model.)

*To all whom it may concern:*

Be it known that I, JOHN H. STARIN, of Fultonville, in the State of New York, have invented a certain new and useful Apparatus for Steaming Clams, Oysters, and other Similar Articles of Food, of which the following is a specification, reference being had to the accompanying drawings, which form a part thereof.

In cooking clams and other similar articles of food by steam it has heretofore been the usual practice to place the articles to be cooked in a closed vessel and admit to the vessel steam from an ordinary boiler. This has been found objectionable for the reason that such steam frequently contains vapors of oil and other impurities which impair the flavor of the articles cooked, and the apparatus is also inconvenient to handle. To obviate these objections I have devised a form of apparatus in which the steam from the boiler is not brought directly into contact with the articles to be cooked, but is used to generate steam from water placed in a vessel surrounding the receptacle for the articles to be cooked, so that pure water may be used for the steam actually employed for the cooking, and in which the manipulations required for inserting and removing the articles to be cooked may be performed more conveniently.

Figure 2:
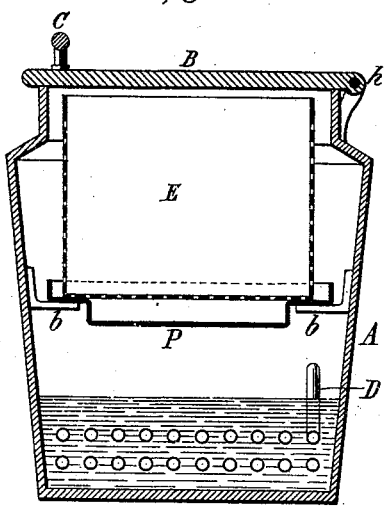
Figure 1:
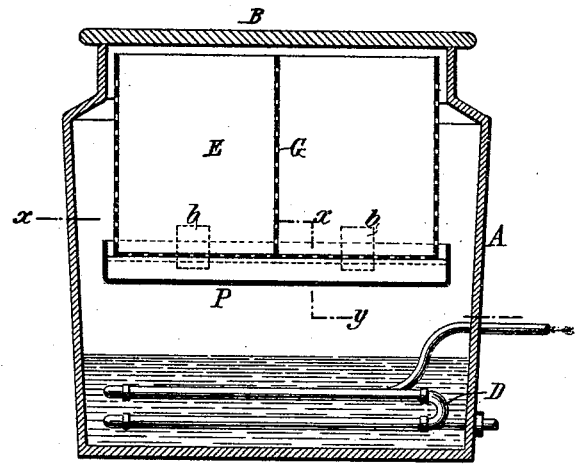
Figure 3:
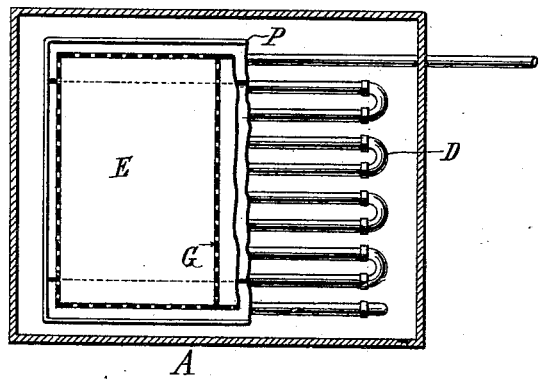

In the drawings, Figure 1 is a longitudinal vertical section. Fig. 2 is a transverse vertical section; and Fig. 3 is a horizontal section, on the line $x\ x\ y$ of Fig. 1, of my improved form of apparatus.

The letters of reference refer to the same parts in all the figures.

A is a vessel, preferably of metal, provided with a close cover B, which is hinged at $h$, and provided with a suitable fastening C for securing it firmly in place. D is a coil of pipe placed in the lower part of the vessel, through which steam from an ordinary boiler is caused to pass, and in using the apparatus sufficient water is placed in the vessel to cover the coil of pipe, as shown in the drawings.

E is a receptacle for holding the clams or other articles to be cooked. It is preferably made of metal and it is perforated so as to admit the steam to its interior. It is supported in the upper part of the vessel above the coil of pipe and the water by the brackets or lugs $b\ b$, attached to the sides of the vessel. Underneath the receptacle E is a pan P for catching the juices of the clams or other articles which are liberated in the process of cooking. This is also supported on the brackets $b\ b$. I have shown the receptacle E as divided into two compartments by the partition G. This is frequently convenient, but is of course not essential. The pan P, it will be observed, is of greater diameter or area than that of the perforated receptacle E, so as to leave an annular space beyond the sides of said receptacle, the object of which being to provide for the catching of any of the juices of oysters or clams which might escape through the sides of the receptacle. The bottom of the pan P, or that portion thereof which comes beneath the bottom of the perforated receptacle, is sunken or dished, so as to form a catch for the juices which naturally flow through the bottom of the receptacle. This feature of construction of the drip-pan and the relative arrangement thereof with the perforated receptacle is quite a feature of the invention, for otherwise much of the juice of the articles being steamed would be lost, whereas by my arrangement it is entirely saved. The articles to be cooked are placed in the receptacle E, which is then set into the vessel A and the lid of the latter is closed. When steam is passed through the coil D, the water contained in the vessel is heated and finally raised to the boiling-point, and the steam thus produced rises and penetrates into the receptacle E through the perforations and cooks the articles contained in it. The steam from the boiler is thus made to do the work without being brought into direct contact with the articles operated upon. The apparatus, moreover, is simple and convenient of manipulation and may readily be taken apart for cleaning.

It will be observed that the receptacle for holding the clams or other articles to be steamed is of smaller diameter than the vessel itself, thus creating a steam-space all around the receptacle and permitting steam to enter the same all around its sides, and thus thoroughly and uniformly steam the articles. It will further be seen that between the heating-coil D and the bottom of the said receptacle a sufficient space is also left in which the steam is generated, so as to keep the interior of the vessel always full of steam, since care should be taken not to let the water rise too high above the level shown.

What I claim, and desire to secure by Letters Patent, is—

In apparatus for steaming clams and similar articles of food, the combination of a closed vessel having a suitable lid and provided on its inner sides with suitable supporting-lugs, a drip-pan resting upon said lugs and formed with the dished or sunken portion, and a perforated receptacle resting upon or supported within the pan and being of a diameter or area smaller than that of said pan, so as to leave a space around the receptacle for the purposes described, and a coil of pipe located in the bottom of the vessel, substantially as shown, and for the purposes set forth.

In witness whereof I have hereunto set my hand this 8th day of December, 1891.

JNO. H. STARIN.

Witnesses:
N. C. FONDA,
W. J. TAYLOR.